United States Patent
Romanski et al.

(10) Patent No.: US 10,442,286 B2
(45) Date of Patent: Oct. 15, 2019

(54) INTEGRATED BRACKET FOR AUTOMOTIVE HEAT EXCHANGER

(71) Applicant: Valeo Autosystemy Sp. z o.o., Skawina (PL)

(72) Inventors: Grzegorz Romanski, Kraków (PL); Andrzej Fudala, Przeworsk (PL); Dawid Szostek, Kraków (PL)

(73) Assignee: Valeo Autosystemy Sp. z o.o., Skawina (PL)

( * ) Notice: Subject to any disclaimer, the term of this patent is extended or adjusted under 35 U.S.C. 154(b) by 0 days.

(21) Appl. No.: 15/324,635

(22) PCT Filed: Jul. 7, 2015

(86) PCT No.: PCT/EP2015/065525
§ 371 (c)(1),
(2) Date: Jan. 6, 2017

(87) PCT Pub. No.: WO2016/005413
PCT Pub. Date: Jan. 14, 2016

(65) Prior Publication Data
US 2017/0203648 A1      Jul. 20, 2017

(30) Foreign Application Priority Data

Jul. 7, 2014 (EP) .................................. 14461552

(51) Int. Cl.
*B60K 11/04* (2006.01)
*F28F 9/00* (2006.01)
*F16B 2/04* (2006.01)

(52) U.S. Cl.
CPC .............. *B60K 11/04* (2013.01); *F16B 2/04* (2013.01); *F28F 9/002* (2013.01); *F01P 2070/52* (2013.01)

(58) Field of Classification Search
CPC ...... B60K 11/04; F16B 2/04; F28F 2009/004; F28F 2280/06; F28F 9/02; F28F 9/002; B62D 25/084; F01P 2070/52
(Continued)

(56) References Cited

U.S. PATENT DOCUMENTS 1,056,874 A * 3/1913 Woodbridge .......... B60K 11/04
180/68.4
6,230,792 B1 5/2001 Potier
(Continued)

FOREIGN PATENT DOCUMENTS

FR      459 791 A      11/1913

OTHER PUBLICATIONS

International Search Report issued in PCT/EP2015/065525 dated Oct. 12, 2015 (2 pages).
(Continued)

*Primary Examiner* — Christopher Garft
(74) *Attorney, Agent, or Firm* — Osha Liang LLP

(57) ABSTRACT

The invention relates to an integrated bracket for an automotive heat exchanger, in particular for a radiator. The integrated bracket comprising a radiator bracket base (2), having an inner side at which the heat exchange is located and an opposite outer side. The bracket base (2) comprises a base plate (2*a*) and a supporting plate (1) which are in contact with their surfaces faced to each other and each of the plates (1, 2*a*) has latching and locking means to engage both plates one to the other. The plate which is selected from said supporting and base plates (1, 2*a*) and which is located at the outer side of the bracket is provided with at least one ball pin (4) integrally formed with said plate and protruding from said plate at its outer side for fixing the bracket base (2) in a car.

10 Claims, 5 Drawing Sheets

(58) Field of Classification Search
USPC .................................. 165/67; 248/689, 209
See application file for complete search history.

(56) References Cited

U.S. PATENT DOCUMENTS

| | | | | |
|---|---|---|---|---|
| 6,386,497 | B1* | 5/2002 | Guyomard | B60K 11/04 248/316.7 |
| 6,405,788 | B1* | 6/2002 | Balthazard | F28F 9/002 165/67 |
| 7,040,380 | B1* | 5/2006 | O'Brien | F28F 9/002 165/149 |
| 2004/0041439 | A1* | 3/2004 | Kafuku | B62D 25/084 296/193.09 |
| 2004/0069442 | A1 | 4/2004 | Yagi et al. | |
| 2007/0246280 | A1* | 10/2007 | Maeda | B60K 11/04 180/68.4 |
| 2011/0209935 | A1* | 9/2011 | Nantais | B60K 11/04 180/68.4 |
| 2016/0001629 | A1* | 1/2016 | Rohr | B60K 11/04 165/76 |
| 2016/0177811 | A1* | 6/2016 | Tanahashi | B60K 11/04 123/41.55 |

OTHER PUBLICATIONS

Written Opinion of the International Searching Authority issued in PCT/EP2015/065525 dated Oct. 12, 2015 (5 pages).

* cited by examiner

INTEGRATED BRACKET FOR AUTOMOTIVE HEAT EXCHANGER

TECHNICAL FIELD

The present invention relates to an integrated bracket for automotive heat exchanger. In particular the present invention relates to an integrated bracket for automotive radiator comprising a radiator bracket base having an inner side at which the heat exchanger is located and an opposite outer side.

TECHNICAL BACKGROUND OF THE INVENTION

It is known the bracket assembly for automotive radiator consisting of two upper and lower parts independently mounted on the radiator housing. The upper part of the bracket for securing the radiator against rotation is in the form of the metal strip bend for attachment to the radiator and to the parts of the vehicle. The lower part of the bracket is in the form of plate from which two fixing arms protrude outwardly and directed downwardly. Both the bracket parts are screwed to the corresponding elements of the car.

It is known the structural solution of the metal bracket attached by brazing around the radiator with the possibility to exchange to a steel bracket fastened by rivets or bolted to the radiator core.

They are known mounting elements of the radiator bracket in the form of threaded screws with a shaped spherical head, bolted to the car elements with the welded or soldered (brazed) nuts.

It is known the bracket for automotive heat exchanger, in particular for radiator, comprising a radiator bracket base in a form of a plate having an upper surface and a lower surface and side edges. One side edge of the base is connected by welding to a mounting arm of the radiator, and the base side edge adjacent to it on one side is provided with a formed longitudinal flanged reinforcement extending to the edge of the mounting arm of the radiator. Said flanged reinforcement is positioned approximately perpendicular to the side edge of the base. On the opposite side to said flanged reinforcement, at the side edge of the base, the supporting protrusion is formed.

Taking into account the structure of the known brackets the inventors of the present invention have started to look for a more economical solution due to the fact that manufacturers of certain types of cars have required the integration of small, upper bracket on the complex plate, which led to a further increase in the cost of producing the bracket base. Finally, the inventors have come to the conclusion that the best solution is ensuring to manufacture of a separate part by injection moulding preferably of plastic, which resulted in a less complex manufacturing method and provided a simpler structure. Therefore, it was proposed two-plate bracket base, wherein one of the plates may be formed by a press forming method as a single part with ball pins, a retaining wall and a resilient latch member.

SUMMARY OF THE INVENTION

In view of the above, the object of the invention is to reduce the disadvantages and drawbacks that are associated with the use of the prior art brackets, or at least to mitigate of the problems discussed above. In particular, the main object of the present invention is to provide an integrated bracket, which would be more economical to mass production and its assembly would be carry out in a shorter time.

The object of the invention is to integrate all peripheral elements in one portion, and then forming a coupled system comprising members clamped to each other. This object is achieved by a integrated bracket for an automotive heat exchanger, in particular for a radiator, according to independent claim 1, wherein the integral bracket is characterized in that the bracket base comprises a base plate and a supporting plate, which are in contact to each other with their surfaces faced to each other, and each of the plates has latching and locking means to engage both plates together; the plate which is selected from said supporting and base plates and which is located at the outer side of the bracket is provided with at least one ball pin integrally formed with said plate and protruding from said plate at its outer side for fixing the bracket base in a car.

The object of the invention is achieved by the fact that said means for latched and locked joining the plates to each other comprises: a through-hole formed in the base plate and at least one protrusion formed in said base plate, and a resilient latching member formed in the supporting plate. The latching element is preferably provided with a locking element adjusted for latching and blocking inside the through-hole of the base plate and at least one slot formed in the supporting plate and fitted to receive said at least one protrusion of the base plate. Furthermore, means for latched and locked joining the plates to each other comprise a coupling element formed on the surface of the supporting plate facing the base plate. Said coupling element is adjusted to pass through said through-hole of said base plate and to block said supporting plate with respect to said base plate in the direction which is approximately perpendicular to the surface of the base plate and the supporting plate.

Preferably said through-hole of said base plate is provided with a widen section and narrow section and said coupling element has a shape adjusted for passing through said widen section of said through-hole and for displacing over narrow section during coupling of the base plate to the supporting plate for blocking said plates together.

Preferably the retaining wall is formed on the supporting plate and it extends toward said base plate and comes into contact with the edge of the base plate after coupling of both plates together. Said retaining wall is provided with at least one slot for receiving at least one protrusion for blocking the bracket.

It is preferred that the integrated bracket comprises an auxiliary mounting arm provided with at least one protrusion, and the retaining wall is provided with at least one slot for receiving at least one protrusion for blocking the bracket.

According to the invention, preferably, the supporting plate has a near-triangular contour and comprises three ball pins arranged near its corners. The bracket base plate can be made of metal, while the supporting plate may be made of pressure die casting and may be made of plastic.

Preferably, the supporting plate is formed with ball pins, retaining wall and resilient latching element as one piece by press forming method. The integrated bracket according to the invention can comprise rubber damping elements to attenuate vibrations and noise. The integrated bracket according to the invention can comprise additional mounting means for assembling of peripheral members such as electrical A/C cables, coolant or oil hoses or other similar parts.

These and other features of embodiments of the invention will now be described in detail with reference to the accompanying drawings, in which:

DESCRIPTION OF THE PREFERRED EMBODIMENT OF THE INVENTION

Figure 1:
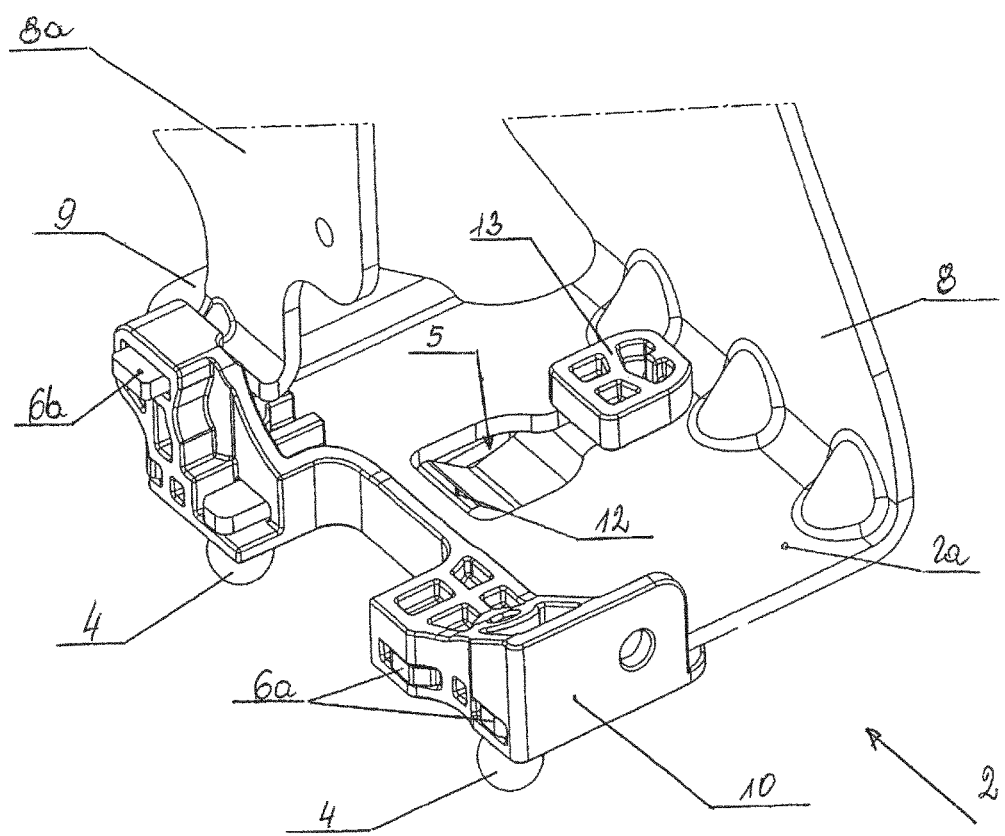
FIG. 1 shows an integrated bracket according to the invention in a perspective view, after coupling the supporting plate and base plate together.
Figure 2:
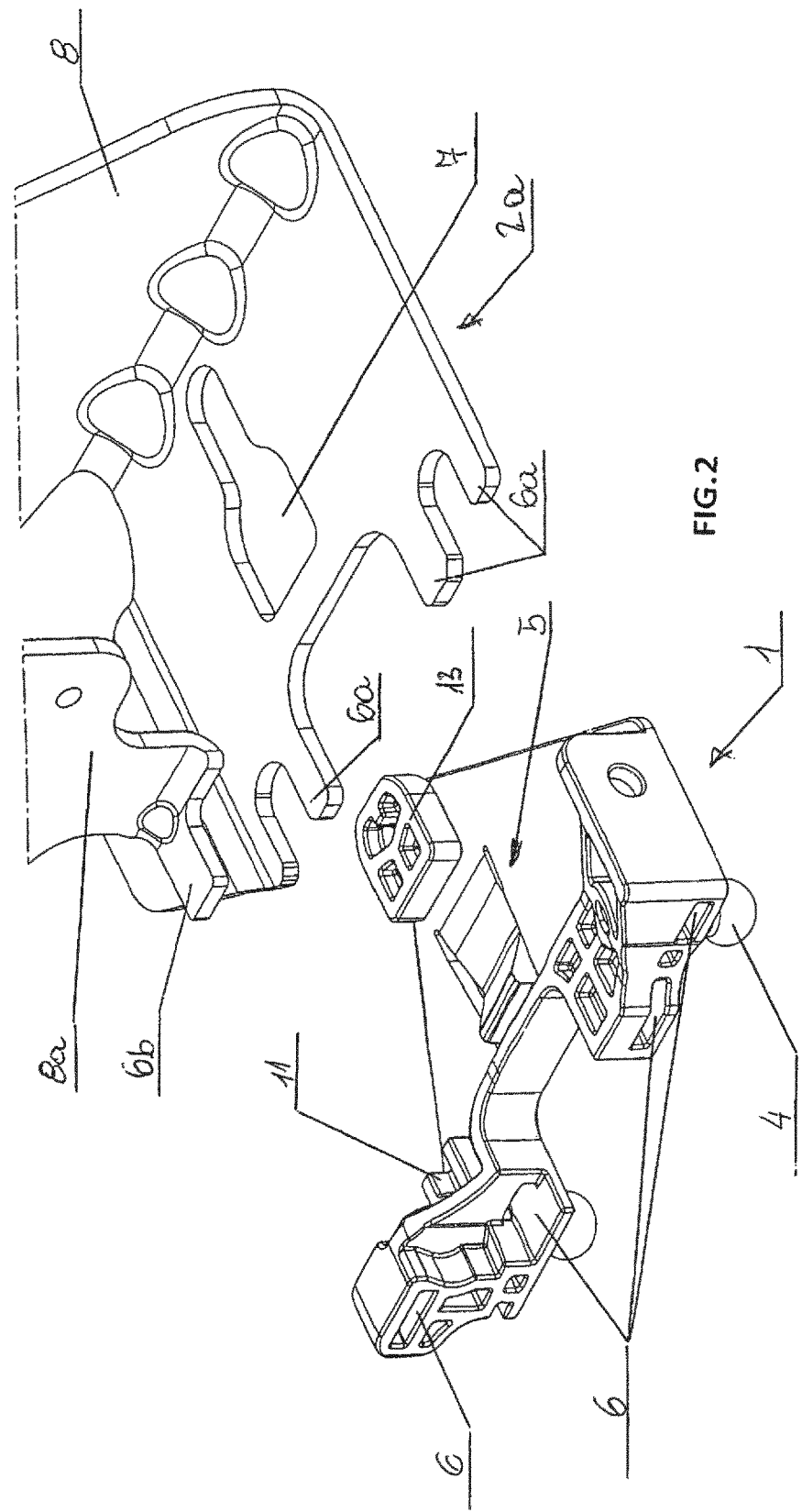
FIG. 2 shows an integrated bracket according to the invention in a perspective view and in the expanded state.

The present invention will be described in more detail hereinafter with reference to the accompanying drawings in which is shown a preferred embodiment of the invention. This invention may, however, be comprised in many different forms and should not be interpreted as limited to the embodiment shown herein;

As shown in FIG. 1 and FIG. 2 the integrated bracket for the vehicle heat exchanger comprises a radiator bracket base 2, which the mounting arm 8 of the bracket is connected to. As best seen in FIG. 2 the radiator bracket base 2 comprises a base plate 2a and the supporting plate 1, which are arranged in contact with each other at their surfaces facing each other upon engagement of the two plates together. A bracket mounting arm 8 may be connected at an angle to the bracket base 2. As a result of such mutual alignment, an area is defined between the mounting arm 8 and the bracket base 2, which area forms the inner side of the bracket, wherein the heat exchanger will be arranged. The supporting plate 1, which is positioned on the outer side of the bracket after coupling both plates, opposite to the inner side thereof, is provided with ball pins 4 integrally formed with said plate. The ball pins 4 are designed for attachment the bracket with the radiator into a car. In a preferred embodiment, there are three ball pins, which will be described hereinafter.

As seen in FIG. 2, a base plate 2 may have a shape similar to rectangle. At its edge opposite to the edge on which a mounting arm 8 is fixed, the base plate 2a is provided with three protrusions 6a, between which three recesses are formed. The central recess is much larger than the other ones. The protrusions 6a are fitted with their shape to be received in the slots 6 formed in a retaining wall 3 of the supporting plate 1.

An auxiliary mounting arm 8a of the bracket provided with a protrusion 6b is indicated in the FIG. 1. The protrusion 6b is designed to additional blocking of the bracket after being placed in a slot formed in the retaining wall 3 of the supporting plate 1. The retaining wall 3 is integrally formed on the supporting plate 1 and it protrudes toward said base plate 2a and is in contact with the edge of the base plate 2a after coupling of the both plates together.

As seen in FIG. 2, a through-hole 7, which can be located approximately in the central part of the base plate 2a, between two protrusions 6a defining the central recess 6a formed on the periphery of the base plate 2a.

The through-hole 7 of the base plate 2a has a widen portion and a narrow portion. As seen in FIG. 2, on the base plate 2a, from the side of the auxiliary arm 8a, the lateral projection 9 is formed.

As it is illustrated in FIG. 2 to FIG. 5 the supporting plate 1 may have a near triangular outline, and it may comprise three ball pins 4 arranged near its corners. The supporting plate 1 is formed with ball pins 4, retaining wall 3 and resilient latching element 5 as one piece by press forming method.

Figure 3:
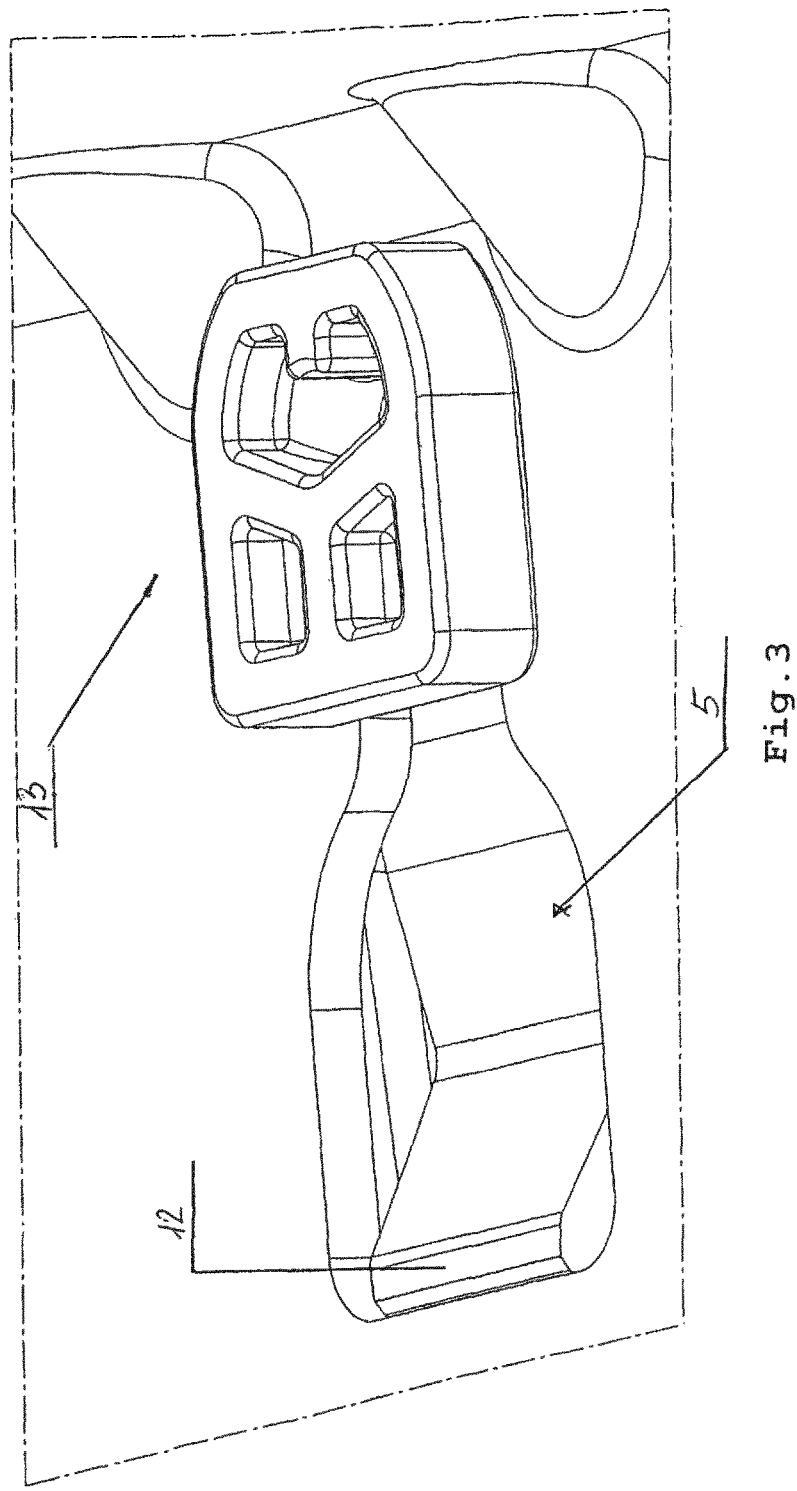
FIG. 3 shows a resilient latching element in a perspective side view and in an enlarged scale.
Figure 4:
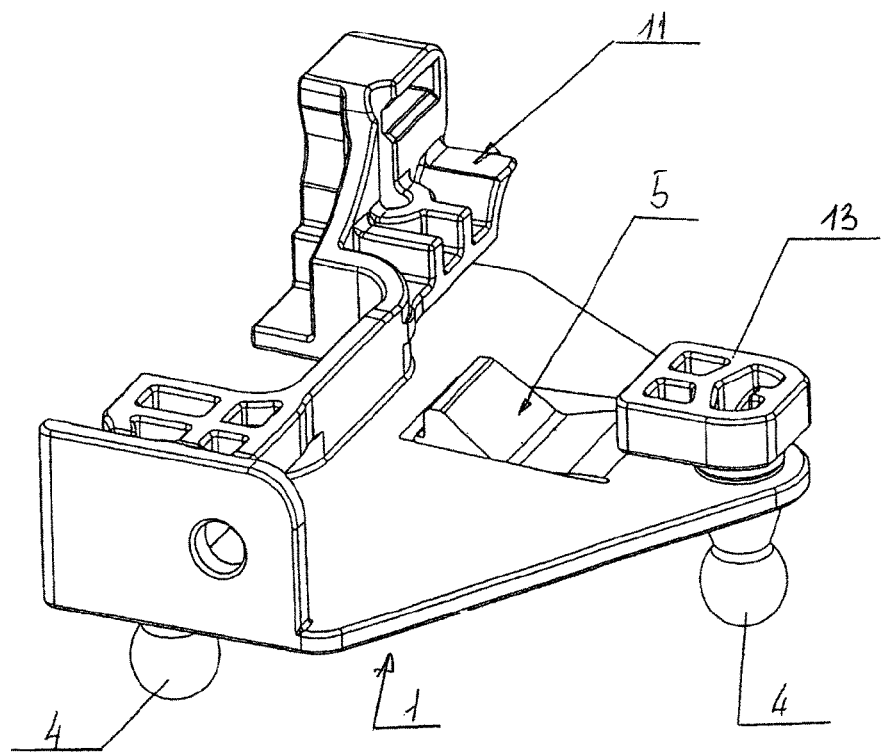
FIG. 4 illustrates the supporting plate of the integrated bracket according to the invention in a perspective view from one side.

The resilient latching element 5, which is one of the coupling elements for both plates for integrating the bracket base, is best shown in FIG. 3. The latching element 5 is formed in the supporting plate 1 and is provided with a retaining element 12 adapted for snap-locking in the through-hole 7 of the base plate 2a. The latching element 5 is disposed on the supporting plate 1 in a location corresponding to the position of the through-hole 7 of the base plate, while the retaining element 12 is shaped to conform to snap-locking inside the through-hole 7, as illustrated in FIG. 3 and FIG. 4. After coupling the base plate 2a to the supporting plate 1, the retaining element 12 has a position locking the supporting plate 1 against movement in relation to the base plate 2a.

On that surface of the supporting plate 1, which faces to the base plate 2a, a coupling element 13 is formed (see FIG. 2 and FIG. 3), the shape of which is adapted to pass through the through-hole 7 of the base plate 2a. The coupling element 13 is also adapted to lock the supporting plate 1 with respect to the base plate 2a in a direction approximately perpendicular to the surface of the base plate 2a and the supporting plate 1.

The coupling element 13 has a shape adjusted for passing through said widen section of said through-hole 7 and for displacing over narrow section during coupling of the base plate 2a to the supporting plate 1 for blocking those plates each other. The coupling element 13 is disposed on the supporting plate 1 in one of its corners and aligned with the latching element 5 and opposite to the retaining element 12. The coupling element 13 protrudes above the surface of the supporting plate 1, and after coupling the two plates together it protrudes above the surface of the integrated bracket according to the invention. The retaining element 13 may have a cuboid-like shape, inside which the ribs are formed.

Figure 5:
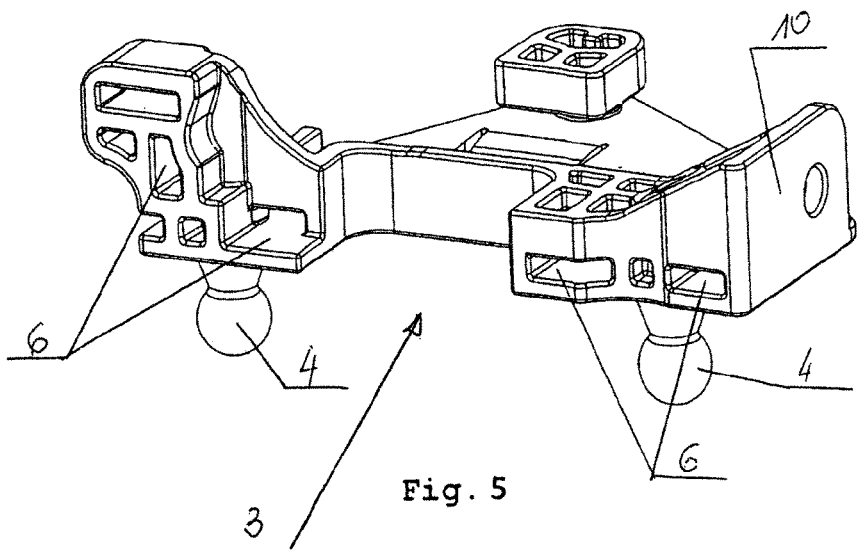
FIG. 5 illustrates the supporting plate of FIG. 4 in a perspective view from the side of the retaining wall.

FIG. 5 shows that the front edge of the base of the supporting plate 1 is formed as a retaining wall 3. The retaining wall 3 comprises a plurality of slots 6 arranged respectively to and fitted to protrusions 6a formed in the base plate 2a of the radiator bracket. The FIG. 1 shows the mutual coupling of protrusions and slots after snap engagement of the two bracket plates to each other. The protrusions 6a of the base plate 2a are inserted into the slots 6 of the supporting plate 1 to provide stiffening to the integrated structure of the bracket.

As apparent from the above description, the means for latched and locked connecting the plates to each other comprises a through-hole 7 formed in the base plate 2a and protrusions 6a formed in said base plate 2a and the resilient latching element 5 formed in the supporting plate 1, which is provided with a retaining element 12 adapted for snap-locking inside the through-hole 7 of the base plate 2a. The slots 6 formed in the supporting plate 1 and adapted to receive one of said protrusions 6a of the base plate 2a as well as the coupling element 13 formed on the surface of the supporting plate facing the base plate 2a forms also the latching means for snap-locking the two plates together.

During assembling of the two plates together in order to form the integrated bracket, the coupling element 13 is initially inserted into the wider part of the through-hole 7, and then, when the supporting plate 1 is moved over the lower surface of the base plate 2a, the coupling element 13 is moved above the surface of the base plate 2a toward the narrower section of the through-hole 7, up to the moment when the retaining element 12 reaches its engaged position in the base plate 2a and protrusions 6a and 6b with the slots 6 are inserted.

As is best seen in FIG. 5, the retaining wall 3 of the supporting plate protruding above the edge of the supporting plate 1 is provided at one end with a support 10 laterally projecting from thereof. Said retaining wall 3 is provided at the opposite end with transverse ribs 11 arranged on the inner side of the bracket. Both the support 10 and the transverse ribs 11 additionally stiffen and reinforce the construction of the supporting plate 1.

As is seen in FIG. 1, a slot 6 for the projection 6a of the auxiliary fixing arm 8a of the radiator bracket is provided on said opposite end of said retaining wall, above the ribs 11. Into said slot said protrusion 6a of the auxiliary arm 8a, corresponding to it, is inserted in order to further block the movement of the base and to ensure the stability and rigidity of the integrated bracket connection.

Figure 6:
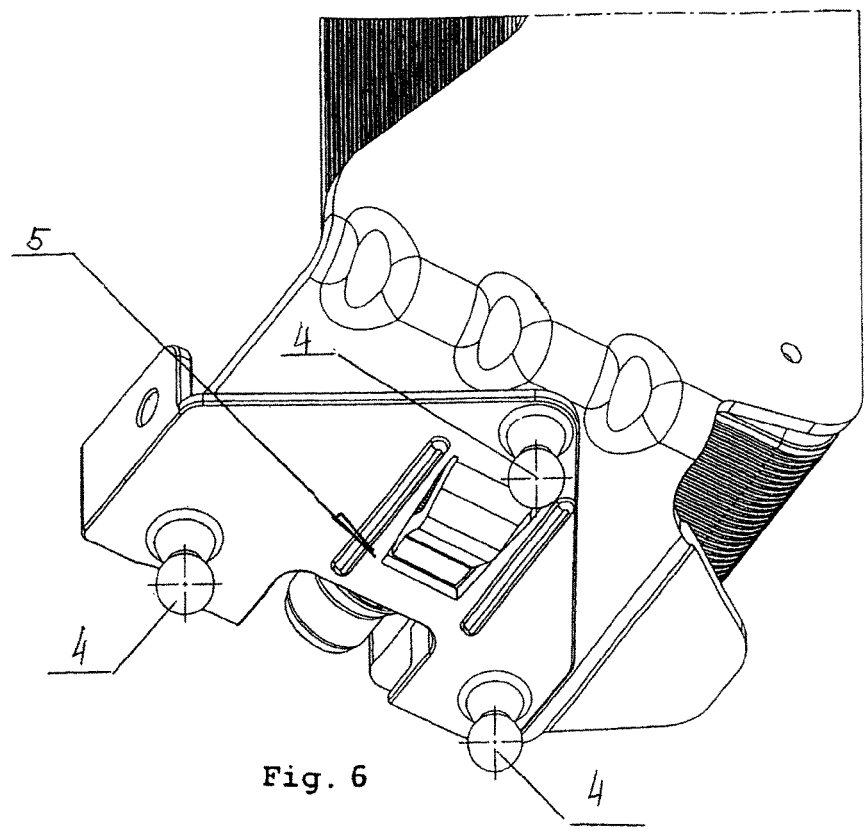
FIG. 6 shows the integrated bracket according to the invention in a perspective view from bottom mounted at an automotive radiator.

FIG. 6 shows the integrated bracket according to the invention in a view from bottom. The mutual arrangement between the ball pins 4 and the latching element 5 of the supporting plate 1 is shown in FIG. 6.

Figure 7:
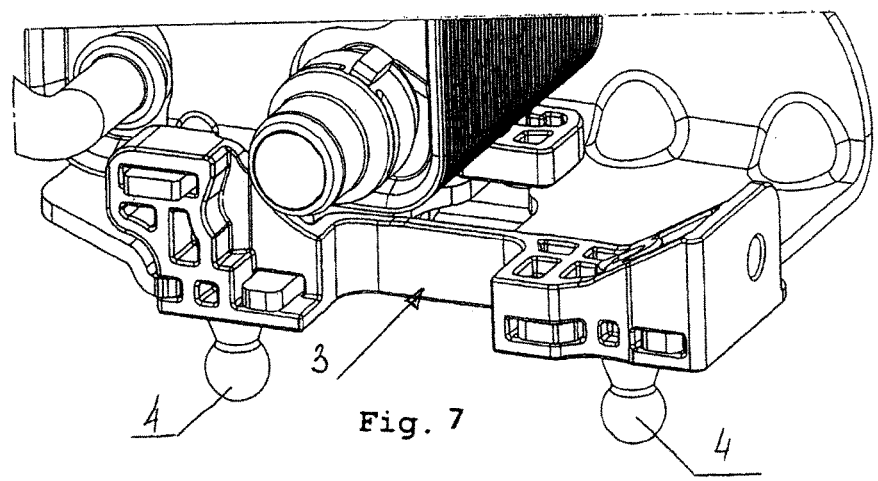
FIG. 7 illustrates the integrated bracket according to the present invention with the automotive radiator mounted on it, in a perspective view from the side of the retaining wall shown in FIG. 5.

FIG. 7 illustrates the integrated bracket according to the invention in a view from the side of the retaining wall 3 with the radiator mounted on it.

According to a preferred embodiment, the base plate 2a of the radiator bracket may be made of metal or other material, depending on the user order. However, the supporting plate 1 coupled to it may be made of plastic.

The supporting plate 1 is formed integrally with ball pins 4 and retaining wall 3 and resilient latching element 5 by press forming method.

The integrated bracket according to the invention may contain other damping means preferably in the form of rubber cushioning elements.

It is obvious that the integrated bracket can additionally comprise mounting means which may be used for assembling of peripheral members such as A/C coolant hoses or oil lines or other components depending on the application.

The integrating operation which integrates the two parts of the integrated bracket is carried out in the following manner. The operator simply presses a supporting plate 1 made of plastic and clamps it on the plate 2a by sliding it over the surface facing towards the surface of the base plate 2a. After sliding the plate 1, it is in the locking position and cannot move because of the latching element 5 formed together with the retaining element 12. When moving the supporting plate, at the same time, as a result of suitable alignment, the protrusions 6a of the metal base plate 2 are received into the slots 6 while the coupling element 13 when moved through the through-hole 7 takes its final position in the narrower section of the through-hole 7. As a result of such operation and the mutual adjustment of the various elements of the bracket, a good mechanical connection between the two parts of the integrated bracket is provided as well as the potential buzzing and compressing between two plates 1 and 2a is minimized. Furthermore, support 10 formed integrally with the supporting plate 1 is used for additional components, such as a coolant hose clamp. Reinforcements by ribs 11 and ribbed coupling element 13 provide good mechanical durability.

The Applicant has conducted a cost simulation, which showed significant savings in material and installation works, which are more simplified by the use of a latching connection and forming the pins as an integrated part of the bracket, in place of the metal pins. In addition, tests have shown a reduction in the level of stress in the attachment and lower frequency noise when mounted on the vehicle.

LIST OF REFERENCE NUMERALS

1—supporting plate
2—radiator bracket base
2a—base plate
3—retaining wall
4—ball pin
5—elastic latch element
6—slot
6a, 6b—projections
7—through-hole
8—mounting arm
8a—auxiliary mounting arm
9—lateral projection of the base plate
10—support plate
11—ribs
12—locking element
13—coupling element

The invention claimed is:

1. An integrated bracket for an automotive heat exchanger, comprising:
   a radiator bracket base, having an inner side at which the heat exchanger is located and an opposite outer side,
      wherein the radiator bracket base comprises a base plate and a supporting plate which are in contact with surfaces of the base plate and the supporting plate facing each other, and wherein the base plate has a protrusion and a through-hole and the supporting plate has a latch element, at least one slot, and a coupling element for engaging and locking the base plate and the supporting plate together, and
      wherein one of the base plate and the supporting plate located at the outer side of the bracket is provided with at least one ball pin integrally formed with said one of the base plate and the supporting plate and protruding from said one of the base plate and the supporting plate at an outer side for fixing the bracket base in a car; and
   an auxiliary mounting arm provided with at least one protrusion, wherein a retaining wall is provided with an additional slot for receiving said at least one protrusion of the auxiliary mounting arm for blocking the bracket.

2. The integrated bracket for an automotive heat exchanger according to claim 1, wherein engaging the plates together comprises:
   the through-hole and the protrusion formed in said base plate,
   the latch element formed in the supporting plate, the latch element being provided with a locking element adjusted for latching and blocking inside the through hole of said base plate,
   the at least one slot formed in the supporting plate and fitted to receive said at least one protrusion of the base plate, and
   the coupling element formed on the surface of the supporting plate that faces the base plate, said coupling element being adjusted to pass through said through-hole of said base plate and to block said supporting plate with respect to said base plate in a direction perpendicular to the surface of said base plate and the supporting plate.

3. The integrated bracket for an automotive heat exchanger according to claim 2, wherein said through-hole of said base plate is provided with a wide section and a narrow section, and said coupling element has a shape adjusted for passing through said wide section of said hole and for displacing over the narrow section during coupling of the base plate with the supporting plate for blocking said plates together.

4. The integrated bracket for an automotive heat exchanger according to claim 2, wherein a retaining wall is formed on the supporting plate and protrudes towards said base plate and comes into contact with an edge of the base plate after the base plate and the supporting plate are in a coupled position, wherein said retaining wall is provided with at least one slot for receiving said at least one protrusion of the base plate and for blocking the bracket.

5. The integrated bracket for an automotive heat exchanger according to claim 4,
wherein the supporting plate has a substantially triangular shape, and
wherein the at least one ball pin comprises three ball pins which are located close to corners of the substantially triangular shape.

6. The integrated bracket for an automotive heat exchanger according to claim 1, wherein said bracket base plate is made of metal.

7. The integrated bracket for an automotive heat exchanger according to claim 1, wherein said bracket supporting plate is made by pressure die casting.

8. The integrated bracket for an automotive heat exchanger according to claim 1, wherein said supporting plate is made of plastic.

9. The integrated bracket for an automotive heat exchanger according to claim 5, wherein said supporting plate comprising the at least one ball pin, the at least one ball pin comprising three ball pins, the retaining wall and the elastic latch element is formed as one piece by press forming.

10. An integrated bracket for an automotive heat exchanger, comprising:
a radiator bracket base, having an inner side at which the heat exchanger is located and an opposite outer side;
wherein the radiator bracket base comprises a base plate and a supporting plate which are in contact with surfaces of the base plate and the supporting plate facing each other, and wherein the base plate has a protrusion and a through-hole and the supporting plate has a latch element, a slot, and a coupling element for engaging and locking the base plate and the supporting plate together,
wherein one of the base plate and the supporting plate located at the outer side of the bracket is provided with at least one ball pin integrally formed with said one of the base plate and the supporting plate and protruding from said one of the base plate and the supporting plate at an outer side for fixing the bracket base in a car,
wherein said through-hole of said base plate is provided with a wide section and a narrow section, and said coupling element has a shape adjusted for passing through said wide section of said hole and for displacing over the narrow section during coupling of the base plate with the supporting plate for blocking said plates together.

* * * * *